US006914533B2

(12) United States Patent
Petite

(10) Patent No.: US 6,914,533 B2
(45) Date of Patent: Jul. 5, 2005

(54) SYSTEM AND METHOD FOR ACCESSING RESIDENTIAL MONITORING DEVICES

(75) Inventor: Thomas D. Petite, Douglasville, GA (US)

(73) Assignee: StatSignal IPC LLC, Atlanta, GA (US)

( * ) Notice: Subject to any disclaimer, the term of this patent is extended or adjusted under 35 U.S.C. 154(b) by 720 days.

(21) Appl. No.: 09/811,076

(22) Filed: Mar. 16, 2001

(65) Prior Publication Data

US 2001/0024163 A1 Sep. 27, 2001

Related U.S. Application Data

(63) Continuation-in-part of application No. 09/790,150, filed on Feb. 21, 2001, now Pat. No. 6,522,974, and a continuation-in-part of application No. 09/439,059, filed on Nov. 12, 1999, now Pat. No. 6,437,692, and a continuation-in-part of application No. 09/412,895, filed on Oct. 5, 1999, now Pat. No. 6,218,953, and a continuation-in-part of application No. 09/271,517, filed on Mar. 18, 1999, now abandoned, and a continuation-in-part of application No. 09/172,554, filed on Oct. 14, 1998, now Pat. No. 6,028,522, and a continuation-in-part of application No. 09/102,178, filed on Jun. 22, 1998, now Pat. No. 6,430,268.

(60) Provisional application No. 60/223,932, filed on Aug. 9, 2000.

(51) Int. Cl.[7] .............................................. G08B 17/10
(52) U.S. Cl. ...................... 340/628; 340/629; 340/630; 340/539.1
(58) Field of Search .............................. 340/628, 629, 340/630, 632, 539.1, 577, 500, 520–524, 531, 540, 534, 286.02, 286.05; 370/310

(56) References Cited

U.S. PATENT DOCUMENTS

| 5,587,705 | A | * | 12/1996 | Morris ....................... 340/628 |
| 5,590,179 | A | | 12/1996 | Shincovich et al. ........ 379/107 |
| 5,619,192 | A | | 4/1997 | Ayala ..................... 340/870.02 |
| 5,818,822 | A | * | 10/1998 | Thomas et al. ............. 370/315 |
| 5,841,764 | A | * | 11/1998 | Roderique et al. .......... 370/310 |
| 5,897,607 | A | | 4/1999 | Jenney et al. ................. 702/62 |
| 5,898,369 | A | * | 4/1999 | Godwin ................. 340/539.26 |
| 5,905,438 | A | * | 5/1999 | Weiss et al. ............. 340/636.1 |
| 5,963,650 | A | | 10/1999 | Simionescu et al. .......... 380/49 |
| 6,087,957 | A | | 7/2000 | Gray ..................... 340/825.54 |
| 6,246,677 | B1 | | 6/2001 | Nap et al. .................... 370/346 |
| 6,366,217 | B1 | | 4/2002 | Cunningham et al. . 340/870.31 |

* cited by examiner

*Primary Examiner*—Anh V. La
(74) *Attorney, Agent, or Firm*—Troutman Sanders LLP; Ryan A. Schneider; James E. Schutz

(57) ABSTRACT

The present invention is directed to a system and method for accessing home monitoring devices remotely via a distributed wide-area network (WAN). More specifically, the present invention is directed towards smoke detector system, which monitors for the presence of smoke and communicates the smoke condition to a remote location. The smoke detection system comprises a smoke detection device connected to a communication device. The smoke detection device outputs a signal or a change in a signal upon detection of smoke. This signal or change in signal is monitored by the communication device. The smoke condition is then communicated to the remote central location via a message system.

12 Claims, 14 Drawing Sheets

FIG. 14 MESSAGE STRUCTURE

| To Addr. (1-6) | From Addr. (6) | Pkt. No. (1) | Pkt. Max. (1) | Pkt. Lngth. (1) | Cmd. (1) | Data (0-109) | CkH (1) | CkL (1) |
|---|---|---|---|---|---|---|---|---|

Sample Messages 1500

Central Server to Personal Transceiver - Broadcast Message - FF (Emergency)

Byte Count = 12

| To Addr. (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

---

First Transceiver to Repeater (Transceiver)
Broadcast Message - FF (Emergency) 1510

Byte Count = 17

| To Addr. (F0) | From Addr. (12345678) | Pkt. No. (00) | Pkt. Max. (00) | Pkt. Lngth. (11) | Cmd. (FF) | Data (A000123456) | CkH (03) | CkL (A0) |
|---|---|---|---|---|---|---|---|---|

Note: Additional Transceiver Re-Broadcasts do not change the message.
The messages are simply received and re-broadcast.

---

1515
Message to Device "A0" From Device "E1" Command - "08" (Respond to PING)
Response will reverse "To" and "From" Addresses Byte Count = 17

| To Addr. (A012345678) | From Addr. (E112345678) | P # (00) | P Max. (00) | P Lngth. (11) | Cmd. (08) | Data (A5) | CkH (04) | CkL (67) |
|---|---|---|---|---|---|---|---|---|

FIG. 15

SYSTEM AND METHOD FOR ACCESSING RESIDENTIAL MONITORING DEVICES

CROSS-REFERENCE TO RELATED APPLICATIONS

This application is a continuation-in-part of U.S. patent applications Ser. No. 09/790,150, now U.S. Pat. No. 6,522,974 filed Feb. 21, 2001, and entitled "System and Method for Monitoring and Controlling Residential Devices," U.S. patent application Ser. No. 09/271,517, now abandoned filed Mar. 18, 1999, and entitled, "System For Monitoring Conditions in a Residential Living Community;" Ser. No. 09/439,059, now U.S. Pat. No. 6,437,692 filed Nov. 12, 1999, and entitled, "System and Method for Monitoring and Controlling Remote Devices," and Ser. No. 09/102,178, now U.S. Pat. No. 6,430,268 filed Jun. 22, 1998, entitled, "Multi-Function General Purpose Transceiver;" Ser. No. 09/172,554, now U.S. Pat. No. 6,028,522 filed Oct. 14, 1998, entitled, "System for Monitoring the Light Level Around an ATM;" Ser. No. 09/412,895, now U.S. Pat. No. 6,218,953 filed Oct. 5, 1999, entitled, "System and Method for Monitoring the Light Level Around an ATM." Each of the identified U.S. patent applications is incorporated herein by reference in its entirety. This application also claims the benefit of U.S. provisional application Ser. No. 60/223,932, filed Aug. 9, 2000, and entitled "Design Specifications for a Smoke Detector Communication device," the contents of which are hereby incorporated by reference.

FIELD OF THE INVENTION

The present invention generally relates to remotely monitored residential systems, and more particularly to a remote smoke detection device, which monitors for the presence of smoke and communicates to a remote controller the smoke condition.

BACKGROUND OF THE INVENTION

As is known, there are a variety of systems for monitoring and controlling manufacturing processes, inventory systems, emergency control systems, and the like. Most automated systems use remote sensors and controllers to monitor and respond to various system parameters to reach desired results. A number of control systems utilize computers or dedicated microprocessors in association with appropriate software to process system inputs, model system responses, and control actuators to implement corrections within a system.

The prior art FIG. 1 sets forth a traditional monitoring system 100. The exemplary monitoring sensor 105 is hardwired to a local controller 110, which communicates to a central monitoring station 115 via the public switched telephone network (PSTN) 125. An example of this kind of system would be a traditional home security system. Each monitoring device 105 such as a smoke detector, motion detector, glass breakage detector, etc. is hardwired to the central monitoring station 115 via the PSTN 125 and the local controller 110.

In particular, residential monitoring systems have multiplied as individuals seek protection and safety in their residences. It has been proven that monitoring for the presence of heat or smoke indicative of a fire and sounding an audible alarm saves lives. In addition, advances have been made to include these fire (heat or smoke) detectors into home security systems. However, these home security systems are often hardwired into the residence, which is costly and quite difficult to install. Also, each residence systems individually communicates with the central location via the PSTN. This connection is quite susceptible to interruption either by accident or on purpose and requires each residence to have a connection into the PSTN.

Accordingly, it would be advantageous to develop a fire monitoring system that easily, reliably, and quickly communicates with a remote central location when necessary.

SUMMARY OF THE INVENTION

To achieve the advantages and novel features, the present invention is generally directed to a system and a cost-effective method for accessing home monitoring devices remotely via a distributed wide-area network (WAN). More specifically, the present invention is directed towards a smoke detector system which monitors for the presence of smoke and communicates the smoke condition to a remote central location.

The smoke detection system comprises a smoke detection device connected to a communication device. The smoke detection device outputs a signal or a change in a signal once smoke is detected. This signal or change in signal is monitored by the communication device. The smoke condition is then communicated to the remote central location via a message system.

In accordance with a broad aspect of the invention, a system is provided having one or more monitoring devices to be accessed ultimately through a computing device in communication with the WAN. The monitoring devices are in communication with wireless transceivers that transmit and/or receive encoded data and control signals to and from the computing device. In this regard, additional wireless repeaters may relay the encoded data and control signals between transceivers disposed in connection with the monitoring devices and a gateway to the WAN. It should be appreciated that, a portion of the information communicated includes data that uniquely identifies the monitoring devices. Another portion of the data is a multi-bit code word that may be decipherable through a look-up table within either the WAN gateway or a WAN interconnected computer.

In accordance with one aspect of the invention, a system is configured to monitor and report system parameters. The system is implemented by using a plurality of wireless transceivers. At least one wireless transceiver is interfaced with a sensor, transducer, actuator or some other device associated with an application parameter of interest. The system also includes a plurality of transceivers that act as signal repeaters that are dispersed throughout the nearby geographic region at defined locations. By defined locations, it is meant only that the general location of each transceiver is "known" by a WAN integrated computer. WAN integrated computers may be informed of transceiver physical locations after permanent installation, as the installation location of the transceivers is not limited. Each transceiver that serves to repeat a previously generated data signal may be further integrated with its own unique sensor or a sensor actuator combination as required. Additional transceivers may be configured as standalone devices that serve to simply receive, format, and further transmit system data signals. Further, the system includes a local data formatter that is configured to receive information communicated from the transceivers, format the data, and forward the data via the gateway to one or more software application servers interconnected with the WAN. The application server further includes means for evaluating the received information and identifying the system parameter and the originating location of the parameter. The application server also includes means for updating a database or further processing the reported parameters.

BRIEF DESCRIPTION OF THE DRAWINGS

The accompanying drawings incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. In the drawings:

FIG. 14 sets forth an embodiment of a messaging system; and

FIG. 15 sets forth sample messages in accordance with the messaging system of FIG. 14.

DETAILED DESCRIPTION OF THE PREFERRED EMBODIMENTS

Figure 1:
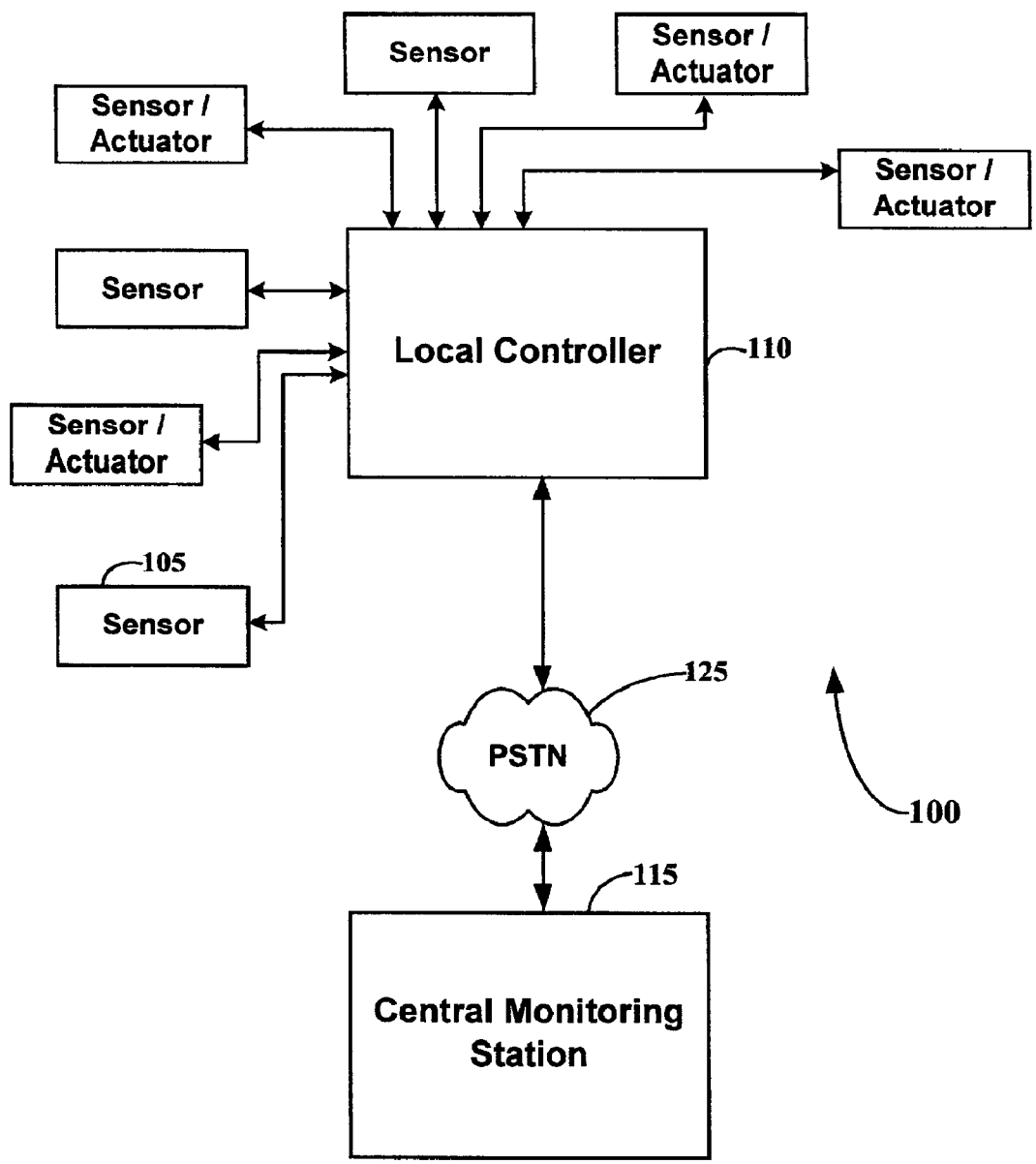
FIG. 1 sets forth a prior art monitoring system.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2:
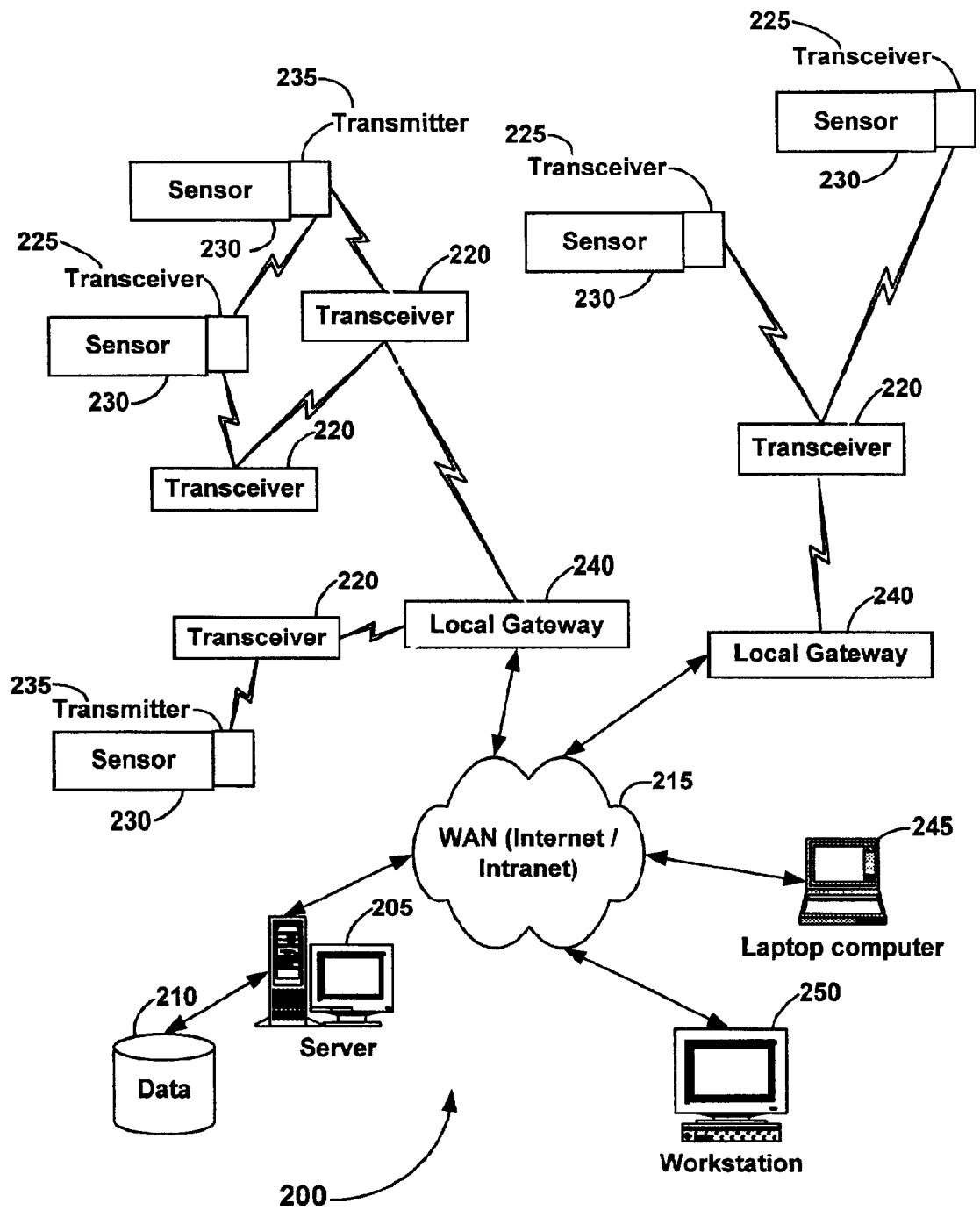
FIG. 2 sets forth a monitoring system in accordance with the present invention.

Reference is now made to FIG. 2, which is a schematic diagram illustrating a distributed data monitoring/control system suitable for home monitoring applications in accordance with the present invention. As illustrated in FIG. 2, a distributed data monitoring/control system (DDMCS) in accordance with the present invention is identified generally by reference numeral 200. The DDMCS 200 may comprise one or more application servers 205 (one shown for simplicity of illustration), one or more data base servers 210, a WAN 215, a plurality of transceiver/repeaters 220, transceivers 225, sensors 230, transmitters 235, and at least one local gateway 240. As is further illustrated in FIG. 2, each of the sensors 230 is integrated such that it is communicatively coupled with a suitably configured RF transceiver/repeater 220, a RF transceiver 225, or a RF transmitter 235. Hereinafter, the group including a RF transceiver/repeater 220, a RF transceiver 225, and a RF transmitter 235 will be referred to as RF communication devices. Those skilled in the art will appreciate the application of the various devices deployed in a wireless network interface between a plurality of residential system sensors 230 and various computing devices in communication with a WAN 215 in a distributed home monitoring system.

Each of the aforementioned RF communication devices is preferably small in size and may be configured to transmit a relatively low-power RF signal. As a result, in some applications, the transmission range of a given RF communication device may be relatively limited. As will be appreciated from the description that follows, this relatively limited transmission range of the RF communication devices is an advantageous and desirable characteristic of the DDMCS 200. Although the RF communication devices are depicted without a user interface such as a keypad, in certain embodiments the RF communication devices may be configured with user selectable pushbuttons, switches, or an alphanumeric keypad suitably configured with software and or firmware to accept operator input. Often, the RF communication devices will be electrically interfaced with a sensor 230 such as with a smoke detector, etc., where user selectable inputs may not be needed.

As illustrated in FIG. 2, the one or more sensors 230 may be communicatively coupled to at least one local gateway 240 via a RF transmitter 235, a RF transceiver 225, or in the alternative, a RF transceiver/repeater 220. Those skilled in the art will appreciate that in order to send a command from the server 205 to a sensor 230, the RF device in communication with the sensor 230 should be a two-way communication device. It will also be appreciated that one or more sensors may be in direct communication with one or more local gateways 240. It will be further appreciated that the communication medium between the one or more sensors and the one or more local gateways 240 may be wireless or for relatively closely located configurations a wired communication medium may be used.

As is further illustrated in FIG. 2, the DDMCS 200 may comprise a plurality of stand-alone RF transceiver/repeaters 220. Each stand-alone RF transceiver/repeater 220 as well as each RF transceiver 225 may be configured to receive one or more incoming RF transmissions (transmitted by a remote transmitter 235 or transceiver 225) and to transmit an outgoing signal. This outgoing signal may be another low-power RF transmission signal, a higher-power RF transmission signal, or alternatively may be transmitted over a conductive wire, fiber optic cable, or other transmission media. The internal architecture of the various RF communication devices will be discussed in more detail in connection with FIG. 3 and FIG. 4. It will be appreciated by those skilled in the art that integrated RF transceivers 225 can be replaced by RF transmitters 225 for client specific applications that require data collection only.

One or more local gateways 240 are configured and disposed to receive remote data transmissions from the various stand-alone RF transceiver/repeaters 220, integrated RF transmitters 235, or the integrated RF transceivers 225. The local gateways 240 may be configured to analyze the transmissions received, convert the transmissions into TCP/

IP format and further communicate the remote data signal transmissions via WAN 215 to one or more application servers 205 or other WAN 215 interconnected computing devices such as a laptop 245, a workstation 250, etc. as would be known to one of ordinary skill in the art. In this regard, and as will be further described below, local gateways 240 may communicate information in the form of data and control signals to the sensor 230 from application server 205, laptop computer 245, and workstation 250 across WAN 215. The application server 205 can be further associated with a database server 210 to record client specific data or to assist the application server 205 in deciphering a particular data transmission from a particular sensor 230. Other configurations can be achieved as would be obvious to one of ordinary skill in the art based upon individual design constraints.

It will be appreciated by those skilled in the art that if an integrated RF communication device (e.g., a RF transmitter 235, a RF transceiver 225, or a RF transceiver/repeater 220) is located sufficiently close to local gateways 240 such that its RF output signal can be received by one or more local gateways 240, the data transmission signal need not be processed and repeated through either a RF transceiver/repeater 220 or a RF transceivers 225. To transmit the RF signal, the RF communication device can use a RF bit speed of 4.8 Kbps at half duplex with a bit speed of 2.4 Kbps and can use Manchester encoding. While these are examples of an RF transmission protocol, it would be obvious to one of ordinary skill in the art to use other bit speeds and encoding methodologies known in the art. By way of example, one could employ quadarture shift keying, which would allow the use of a hexadecimal message in contrast with a binary message.

It will be further appreciated that a DDMCS 200 may be used in conjunction with a variety of residential systems to permit remote data access via a plurality of distributed computing devices in communication with a suitable WAN 215. As will be further appreciated from the discussion herein, each of the RF communication devices may have substantially identical construction (particularly with regard to their internal electronics), which provides a cost-effective implementation at the system level. Furthermore, a plurality of stand-alone RF transceiver/repeaters 220, which may be identical to one another, may be disposed in such a way that adequate coverage throughout a residence and or a residential community is provided. Preferably, stand-alone RF transceiver/repeaters 220 may be located such that only one stand-alone RF transceiver/repeater 220 will pick up a data transmission from a given integrated RF transceiver 225 and/or RF transmitter 235. However, in certain instances two or more stand-alone RF transceiver/repeaters 220 may pick up a single data transmission. Thus, the local gateways 240 may receive multiple versions of the same data transmission signal from an integrated RF transceiver 225, but from different stand-alone RF transceiver/repeaters 220. As will be further explained in association with the preferred data transmission protocol, duplicative transmissions (e.g., data transmissions received at more than one local gateway 240 originating from a single RF communication device) may be appropriately handled.

Significantly, the local gateways 240 may communicate with all RF communication devices. Since the local gateways 240 are permanently integrated with the WAN 215, the application server 205 of FIG. 2 can host application specific software, which was typically hosted in a local controller 110 of FIG. 1. Of further significance, the data monitoring and control devices of the present invention need not be disposed in a permanent location as long as they remain within signal range of a system compatible RF communication device that subsequently is within signal range of a local gateway 240 interconnected through one or more networks to the application server 205. Of still further significance, the DDMCS 200 as illustrated in FIG. 2, provides a flexible access and control solution through virtually any suitably configured computing device in communication with the WAN 215. As by way of example, a laptop computer 245 and/or a computer workstation 250 appropriately configured with suitable software may provide remote operator access to data collected via the DDMCS 200. In more robust embodiments, the laptop computer 245 and the computer workstation 250 may permit user entry of remote operative commands.

In one preferred embodiment of the DDCMS 200, an application server 205 collects, formats, and stores client specific data from each of the integrated RF transmitters 235, RF transceivers 225, and or RF transceiver/repeaters 220 for later retrieval or access from workstation 250 or laptop 245. In this regard, workstation 250 or laptop 245 can be used to access the stored information via a Web browser in a manner that is well known in the art. In a third embodiment, clients may elect for proprietary reasons to host control applications on their own WAN 205 (not shown) connected workstation 250. In this regard, database 210 and application server 205 may act solely as data collection and reporting devices with the client workstation 250.

It will be appreciated by those skilled in the art that the information transmitted and received by the RF communication devices of the present invention may be further integrated with other data transmission protocols for transmission across telecommunications and computer networks other than the WAN 215. In addition, it should be further appreciated that telecommunications and computer networks other than the WAN 215 can function as a transmission path between the communicatively coupled RF communication devices, the local gateways 240, and the application server 205.

Figure 3:
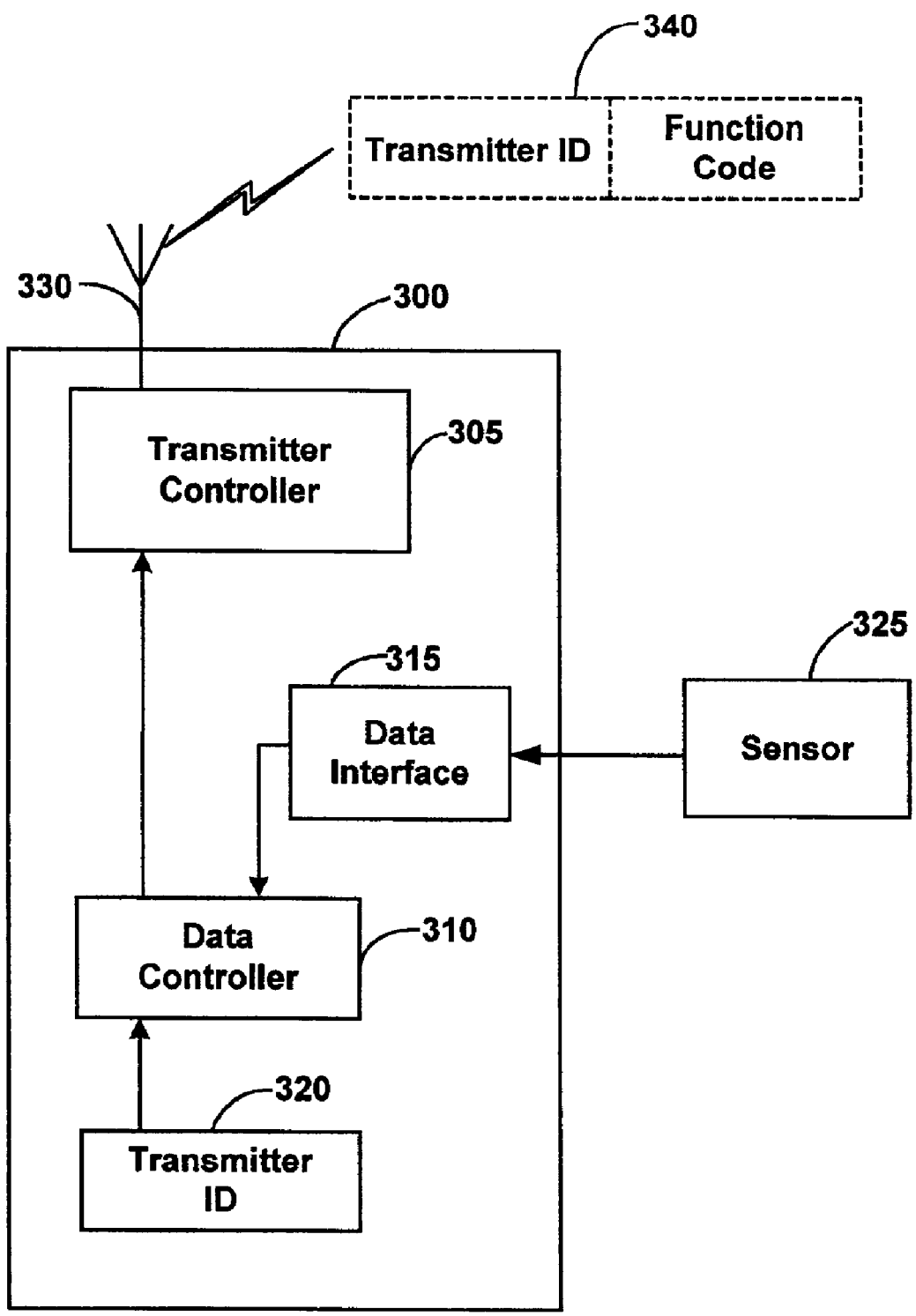
FIG. 3 sets forth an embodiment of a communication device in accordance with the present invention.

FIG. 3 sets forth an embodiment of the communication device 300 of the present invention. The communication device comprises a transmitter controller 305, a data controller 310, a data interface 315, a transmitter identifier 320, and a sensor 325 from which the communication device 300 receives data signals. While the communication device 300 is shown as a RF transmitter, it could also be an infrared, ultrasound, or other transmitter as would be obvious to one of ordinary skill in the art. As shown, the data interface 315 receives the data signal and processes the data signal accordingly. This processing can include signal conditioning, analog to digital conversion, etc. as is known to one of ordinary skill in the art depending upon individual design constraints. The data interface 315 outputs the conditioned sensor signal to the data controller 310. The transmitter ID 320 is a unique identifier of the communication device 300 and can be an EPROM or other appropriate device as would be known to one of ordinary skill in the art. The data controller 310 uses the conditioned sense signal and the transmitter identifier 320 to create a message 340 according to a messaging protocol system. The data controller 310 then outputs the message 340 to the transmitter controller 305, which transmits the message 340 via the antenna 330. The antenna 330 can be an externally mounted, vertically polarized antenna that can be mounted on a printed circuit board (not shown) or any other appropriate embodiment as would be known to one of ordinary skill in the art.

Each transmitter unit 300 in a DCCMS 200 (FIG. 2) may be configured with a unique identification code (e.g., a transmitter identification number) 320, that uniquely identifies the RF transmitter 320 to the various other devices within the DCCMS 200 (FIG. 2). The transmitter identifier 320 may be programmable, and implemented in the form of, for example, an EPROM. Alternatively, the transmitter identifier 320 may be set/configured through a series of dual inline package (DIP) switches. Additional implementations of the transmitter identifier 320, whereby the number may be set/configured as desired, may be implemented consistent with the broad concepts of the present invention.

It will be appreciated that the transmit controller 305 may convert information from digital electronic form into a format, frequency, and voltage level suitable for transmission from antenna 330. As previously mentioned, the transmitter identifier 320 is set for a given transmitter 300. When received by the application server 160 (FIG. 2), the transmitter identifier 320 may be used to access a look-up table that identifies, for example, the residence, the system, and the particular parameter assigned to that particular transmitter. Additional information about the related system may also be provided within the lookup table, with particular functional codes associated with a corresponding condition or parameter, such as but not limited to, an appliance operating cycle, a power on/off status, a temperature, a position, and/or any other information that may be deemed appropriate or useful under the circumstances or implementation of the particular system.

Figure 4:
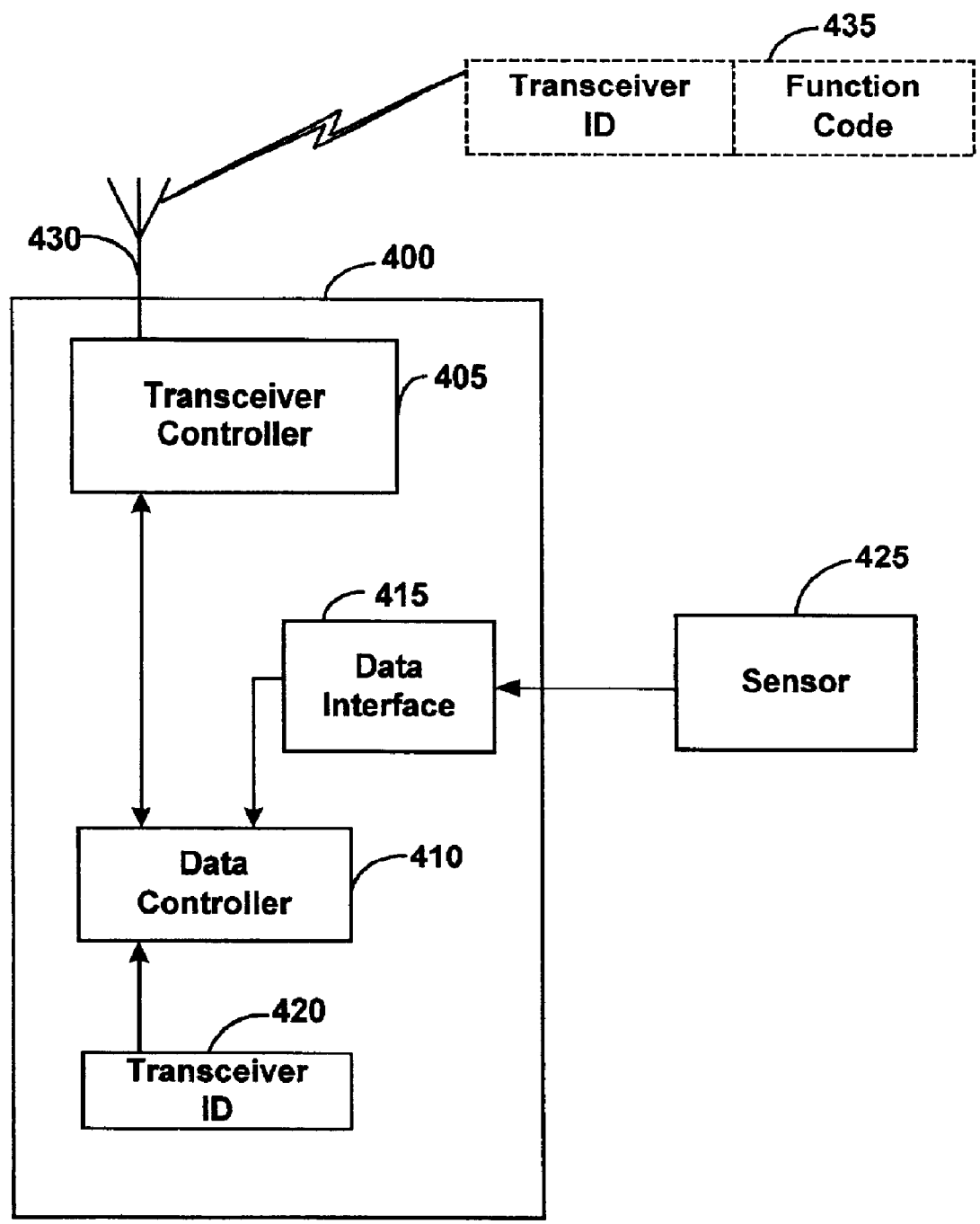
FIG. 4 sets forth an alternate embodiment of a communication device in accordance with the present invention.

FIG. 4 sets forth and alternate embodiment of the communication device 400 wherein the transmitter has been replaced with a transceiver. This allows the communication device to function as a repeater as well as receive commands from the local controller.

The communication device 400 comprises a transceiver controller 405, a data controller 410, a data interface 415, a transceiver identifier 420, and a sensor 425. While the communication device 400 is shown as a RF transceiver, it can also be an infrared, ultrasound, or other transceiver as would be obvious to one of ordinary skill in the art. The data interface 415 receives the sensed signal from the sensor 425 and processes it as discussed above. The data controller 410 receives the processed sensor signal, and composes a message 435 according to a preformatted message system. The transceiver controller 405 receives the message 435 and transmits the message 435 via the antenna 430.

It will be appreciated that the transceiver controller 405 may convert information from digital electronic form into a format, frequency, and voltage level suitable for transmission from the antenna 430. As previously mentioned with respect to the RF transmitter of FIG. 3, the transceiver identification 420 is set for a given communication device 400. When received by the application server 205 (FIG. 2), the transceiver identifier 420 may be used to access a look-up table that identifies, for example, the residence, the system, and the particular parameter assigned to that particular transceiver. Additional information about the related system may also be provided within the lookup table, with particular functional codes associated with a corresponding condition or parameter such as but not limited to, smoke conditions, a power on/off status, and/or any other information that may be deemed appropriate or useful under the circumstances or implementation of the particular system. The communication device 400 may be configured to receive a forward command information either using a unique RF frequency or a time interleaved packet based communication technique.

Again, each of these various input signals are routed from the sensor 425 to the data interface 415, which provides the information to a data controller 410. The data controller 410 may utilize a look-up table to access unique function codes that are communicated in data packet 435, along with a transceiver identifier 420, to a local gateway 110 and further onto a WAN 130 (FIG. 2). It is significant to note that the message can include a concatenation of the individual function codes selected for each of the aforementioned input parameters, as well as, a similar message (not shown) that may be received from other closely located RF transmitters 235 and RF transceivers 225 (FIG. 2).

It will be appreciated by persons skilled in the art that the various RF communication devices illustrated and described in relation to the functional block diagrams of FIG. 3 and FIG. 4 may be configured with a number of optional power supply configurations. For example, a personal mobile transceiver may be powered by a replaceable battery. Similarly, a stand-alone RF transceiver/repeater 220 (FIG. 2) may be powered by a replaceable battery that may be supplemented and or periodically charged via a solar panel. These power supply circuits, therefore, may differ from RF communication device to RF communication device depending upon the remote system monitored, the related actuators to be controlled, the environment, and the quality of service level required. Those skilled in the art will appreciate and understand how to meet the power requirements of the various RF communication devices associated with the DCCMS 200 of the present invention. As a result, it is not necessary to further describe a power supply suitable for each RF communication device and each application in order to appreciate the concepts and teachings of the present invention.

The sensing system can comprise a communication device as described above and a sensing device. The sensing device can sense a condition and output a sensed signal. The sensed signal can be any format such as analog, digital, etc. given that the data interface is also configured to accommodate.

Figure 5A:
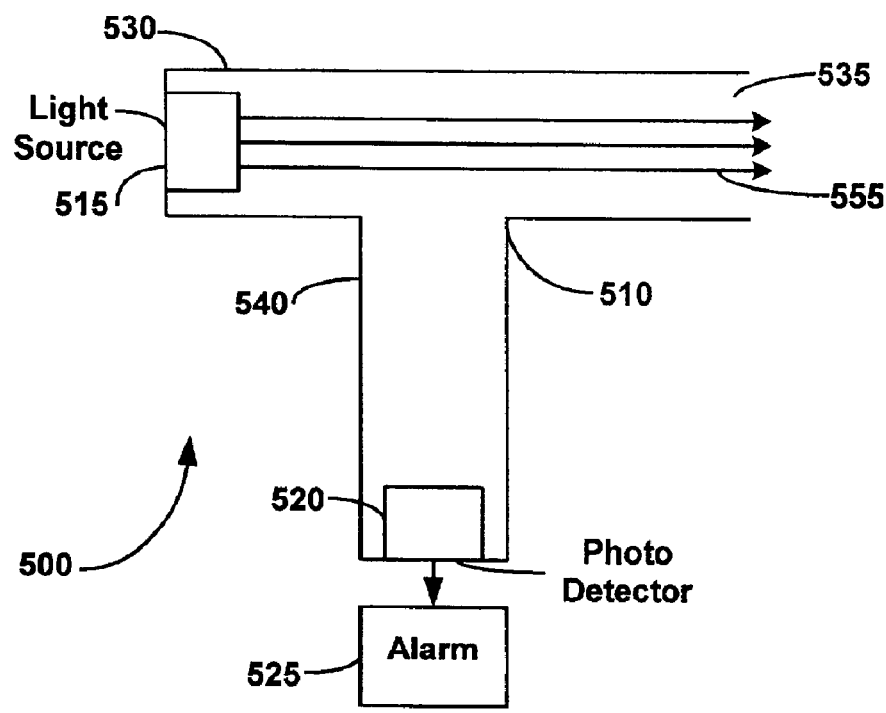
FIGS. 5A and 5B set forth a smoke detection device in accordance with the present invention.
Figure 5B:
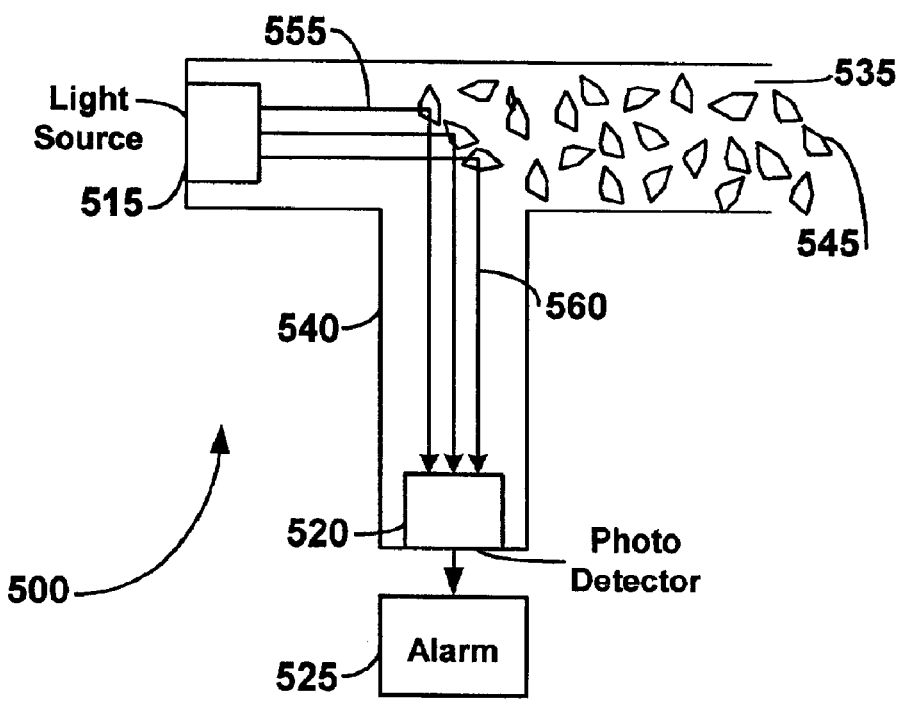
Figure 6:
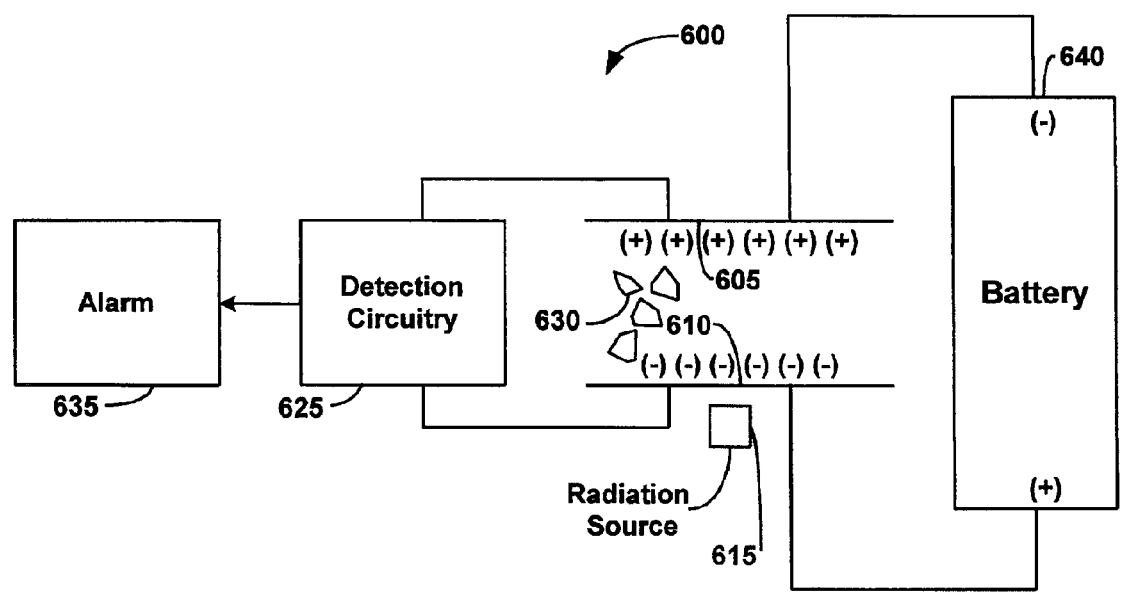
FIG. 6 sets forth an alternate smoke detection device in accordance with the present invention.

FIGS. 5A, 5B, and FIG. 6 set forth different embodiments of an exemplary sensor for use with the sensing system. FIG. 5A sets forth a photo detection smoke detector 500, which uses light to detect a smoke condition. The photo detection smoke detector 500 comprises a T light tube 510, a light source 515, photo detection circuitry 520, and an alarm 525. The T light tube 510 has the light source 515 at one end of the tube 530 and an opening at the other end of the tube 535. Perpendicular to and attached to the tube 530 is a leg tube 540. At the end of the leg tube 540 is the photo detector circuitry 520. The photo detector circuitry 520 communicates with the alarm 525 upon detection of smoke.

As shown in FIG. 5B, to detect smoke, the light source 515 emits a light beam 555 constantly or near constantly. If smoke is present, the smoke particles 545 enter the end of the tube 535. The smoke particles 545 interact with the light beam 555, causing the light beam 540 to refract. This refracted light 560 can then travel down the leg tube 540 and fall upon the photo detector circuitry 520. The photo detector circuitry 520 outputs an alarm signal to the alarm 525, which then sounds. The smoke detector 500 can either be powered by a battery (not shown) or AC wiring (not shown).

FIG. 6 sets forth a block diagram of an alternate embodiment of a smoke detector 600. This ionizing smoke detector 600 comprises two plates 605, 610 which are oppositely charged and a small radiation source 615. The battery 640, the oppositely charged plates 605, 610, and the radiation source 615 form an ionized field 620 between the plates, which is then monitored by the detection circuitry 625. The area between the plates 605, 610 is exposed to the ambient environment. Under smoke conditions, the smoke particles 630 will enter between the plates 605, 610, disrupting the ionization field 620. The detection circuitry 625 then detects the change in the ionized 620 field and signals the alarm 635 to sound. While this smoke detector 600 shows a battery 640 as a power source, the battery 640 can be replaced with the appropriate AC wiring (not shown) as would be obvious to one of ordinary skill in the art.

Figure 7:
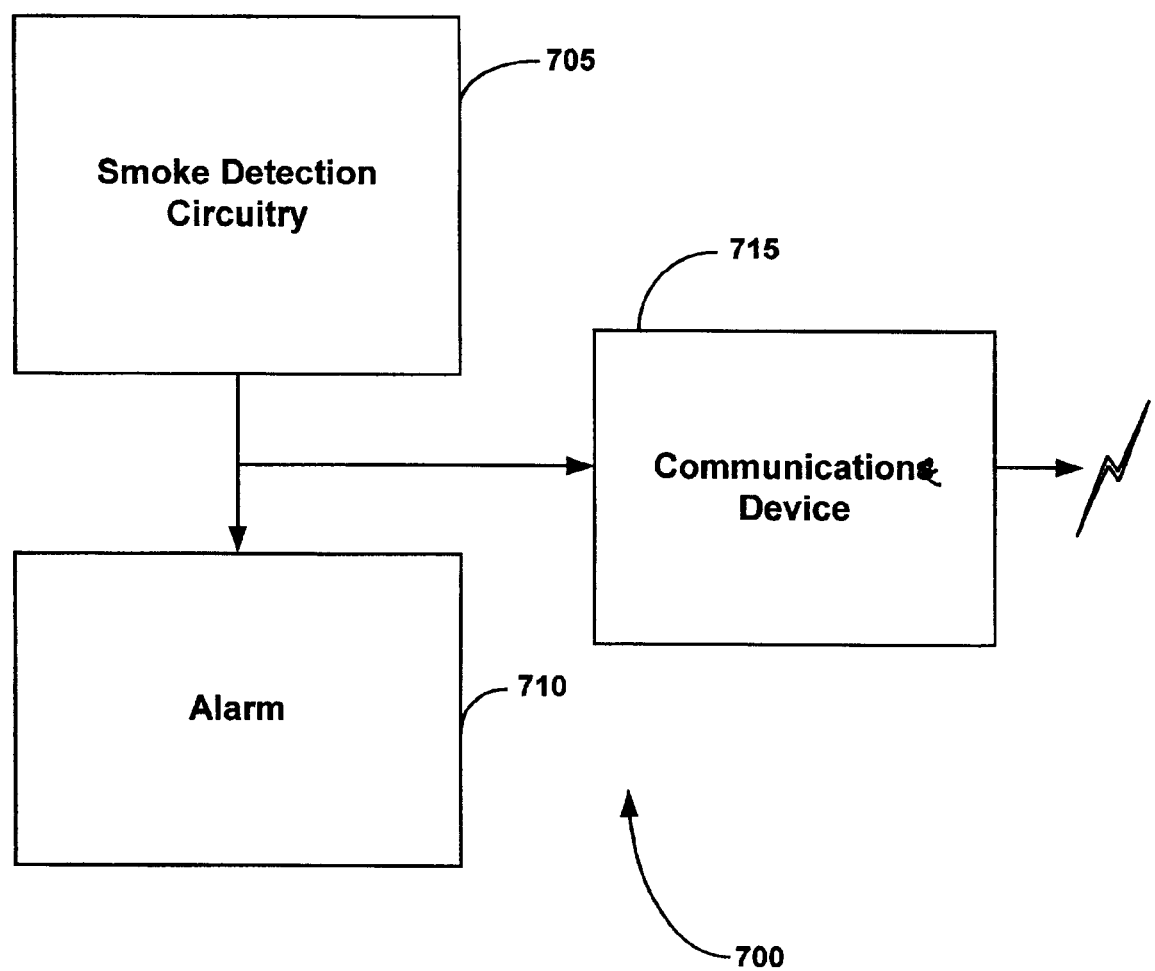
FIG. 7 sets forth a block diagram of the smoke detection system in accordance with the present invention.

FIG. 7 sets forth a block diagram of an embodiment of the sensing system 7000. The sensing system 700 can comprise of a smoke detector 705, an alarm 710, and a communication device 715. The smoke detector 705 can be any of the know types of smoke detectors including those discussed above. The alarm can be an audible alarm, visual alarm, etc. based upon individual needs. The communication device can be either the transmitter device 300 of FIG. 3 or the transceiver device 400 of FIG. 4.

In operation, the smoke detector 705 monitors for the presence of smoke. The method of smoke detection depends upon the type of smoke detector used as discussed above. Upon the detection of smoke, the smoke detector 705 outputs a control signal to the alarm 710. The alarm 710 then activates. The method of activation depends upon the type of alarm.

In addition, the communication device 715 monitors for the alarm control signal. Once the smoke detector 705 sends the alarm control signal, the communication device 715 also receives the control signal. The communication device 715 then process the control signal and transmits a message regarding the control signal to the local gateway 240 of FIG. 2 via the message protocol system discussed above.

Whereas the present invention is discussed in terms of particular embodiments of smoke detectors, it would be obvious to one of ordinary skill in the art to implement other embodiments of smoke detectors as well as other sensing devices.

Figure 8:
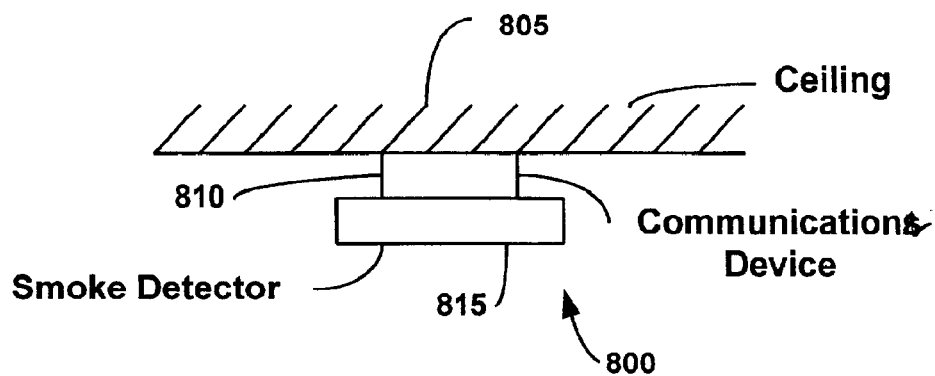
FIG. 8 sets forth a perspective of the smoke detection system of the present invention.

FIG. 8 sets forth a perspective of the sensing system 800. The sensing system 800 can be hung from the ceiling 805 with communication device 810 between the smoke detector 815 and the ceiling 805. The sensing system 800 can be mounted to the ceiling in the traditional manner or another manner dependant upon the individual conditions. Traditionally, the smoke detector 815 would be mounted to the ceiling via screws or a mounting plate and screws. In the case of the sensing system 800, the sensing system 800 can be installed similarly. Likewise, it would be obvious to ordinary skill in the art to install the device in alternate orientations such as on a wall, etc. In the case of a wall mount, the sensing system 800 can again be mounted to the wall via screws or a mounting plate. Alternatively, the sensing system 800 could be mounted via the plug extensions used to connect the sensing system to a wall outlet (not shown).

Likewise, it would be obvious to one of ordinary skill in the art to integrate the smoke detector 815 and the communication device 810 into a single package for ease of installation or to integrate the smoke detector 815 and communication device 810 as separate but interconnected elements for ease of replacement in the case of device failure. Alternatively, it would have been obvious to one of ordinary skill in the art to connect the communication device 810 and smoke detector 815 as separate devices remotely located one from another but in electrical communication.

The communication device 810 can be powered by the same power supply (not shown) that powers the smoke detector 815 or by an alternate power supply (not shown). The smoke detector 815 can be powered by a battery, AC wiring, rechargeable batteries, etc. as would be obvious to one of ordinary skill in the art depending upon individual situations. If the communication device 810 is acting as both a sensing system and a repeater as discussed above, the communication device 810 could have a dedicated power supply (not shown). The power supply (not shown) can be a battery, a rechargeable battery, or AC power with battery backup.

Figure 9:
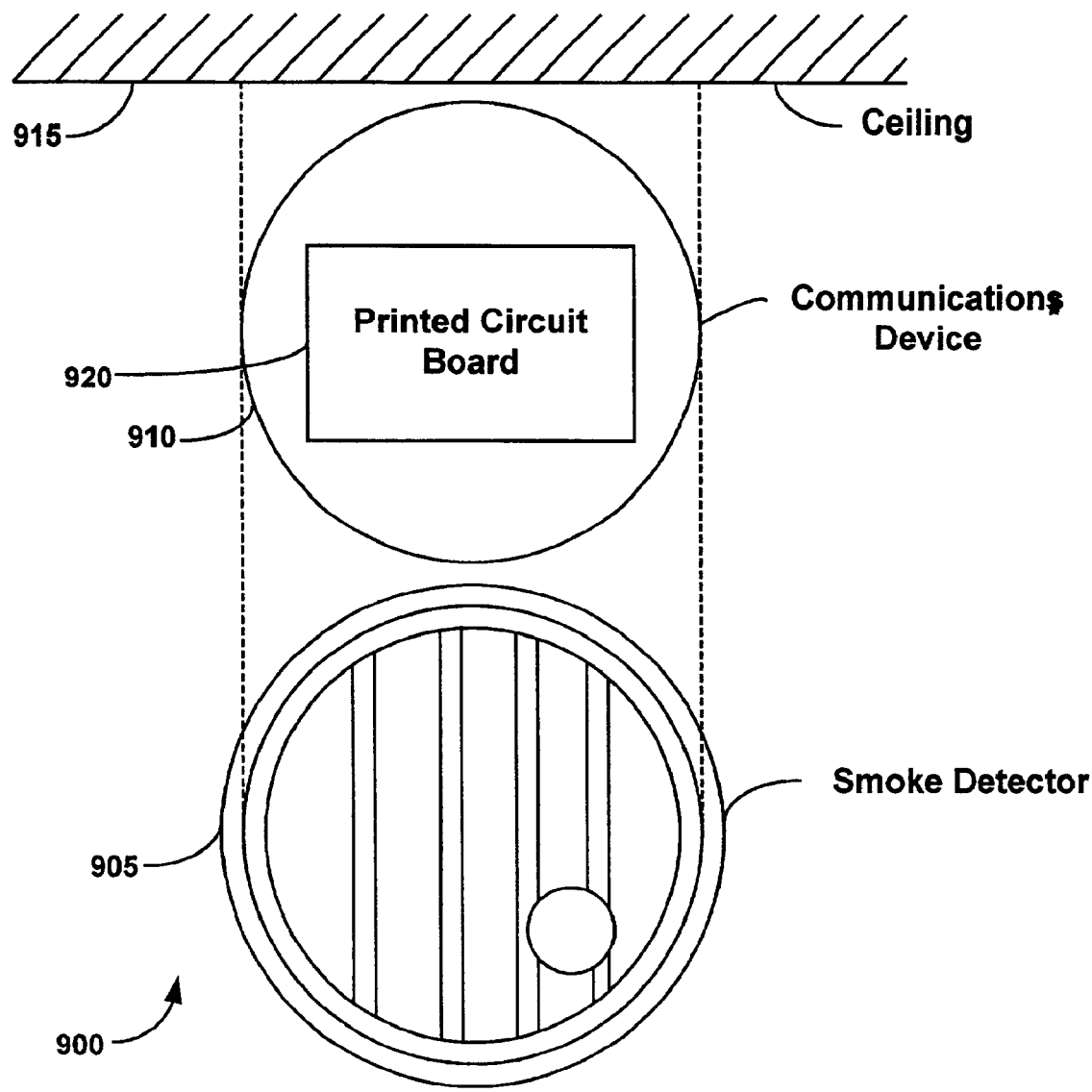
FIG. 9 sets forth a cross sectional view of the smoke detection system of the present invention.

FIG. 9 shows and exploded perspective of the sensing system 900. The sensing system 900 comprises a smoke detector 905 and a communication device 910 attached to the ceiling 915. As shown, the communication device 910 is attached directly to the ceiling 915, and the smoke detector 905 is attached to the ceiling 915. As would be obvious to one of ordinary skill in the art, the smoke detector 905 could be attached to the ceiling separate from the communication device 910. In addition, the smoke detector 905 could be attached to the ceiling 915 and capture the communication device 910 between the ceiling and the smoke detection 905. Alternatively, as discussed above, the sensing system 900 can be attached to a wall, etc. as needed in individual design situations. The circuitry of the communication device 910 is shown as a printed circuit board 920. As is well known to one of ordinary skill in the art, the communication device 910 can be embodied in other forms such as hybrid microelectronics, hardwired, etc.

Figure 10A:
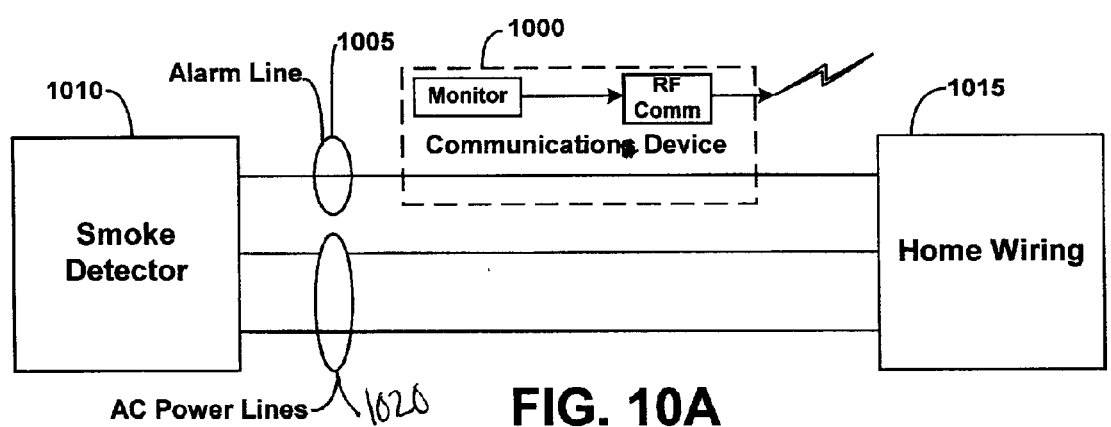
FIGS. 10A and 10B set forth a block diagram of an alternate embodiment of the smoke detection system of the present invention.
Figure 10B:
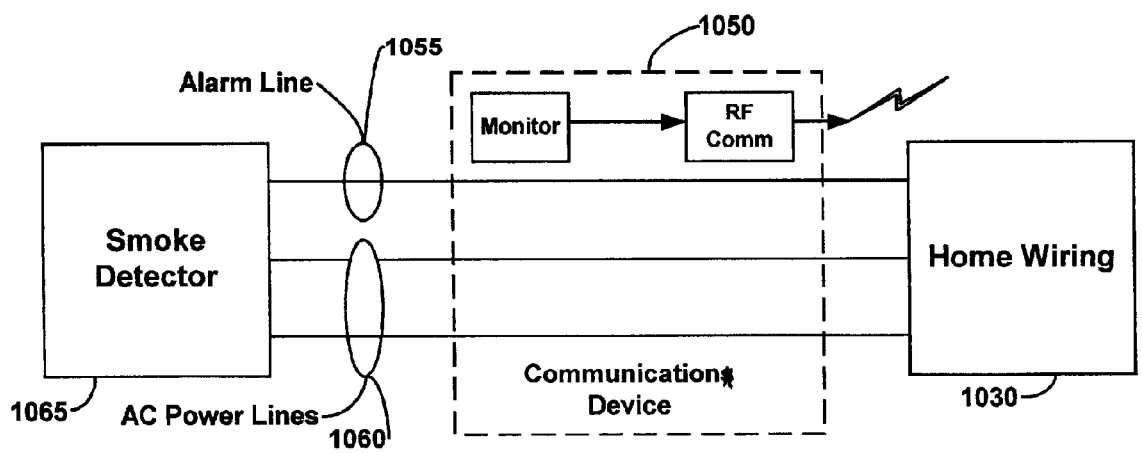

FIGS. 10A and 10B sets forth a block diagram of alternate embodiments of the sensing system. In these embodiments, the smoke detector is wired into the residence's AC wiring and is wired to communicate with any other smoke detector in the system. While these figures set forth the sensing system as being powered via AC wiring, this in no way limits the use of this invention with a AC power supply. Other power supplies such as batteries, rechargeable batteries, combinations thereof, etc. as discussed above would be obvious to one of ordinary skill in the art depending upon individual design constraints.

In FIG. 10A, the communication device 1000 is connected to the alarm line 1005. When the smoke detector 1010 notifies any other detectors (not shown) via the home wiring 1015 of the alarm condition, the communication device 1000 also receives the alarm signal and sends the appropriate message to the local gateway as discussed above. It should be noted that the AC power lines 1020 do not pass through the communication device 1000.

FIG. 10B sets forth an alternate embodiment of the AC wired smoke detection system. Again, when the smoke detector 1065 notifies the other detectors (not shown) via the home wiring 1030 of the alarm condition, the communication device 1050 also receives the alarm signal and sends the appropriate message to the local gateway as discussed above. In this case, the communication device 1050 acts as a pass-through for both the alarm line 1055 and the AC power lines 1060 that is connected to the smoke detector 1065 and the home wiring 1070.

Figure 11:
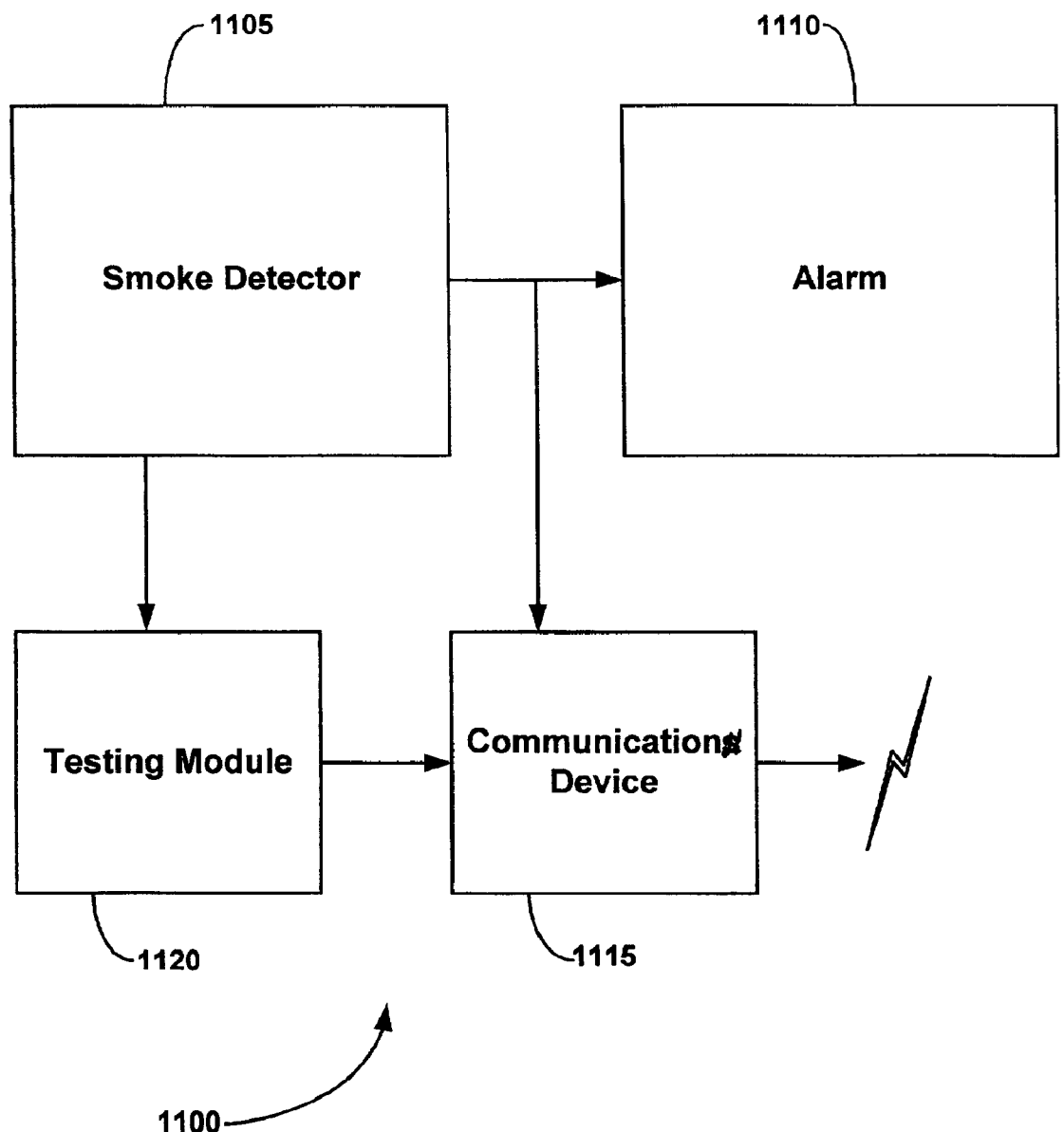
FIG. 11 sets forth a block diagram of an alternate embodiment of the smoke detection system of the present invention.

FIG. 11 sets forth a block diagram of another alternate embodiment of the sensing system 1100. In this embodiment, the sensing system 1100 comprises the smoke detector 1105, the alarm 1110, the communication device 1115, and a testing module 1120. The sensing system 1100 monitors for the smoke condition and sends a control signal to the alarm 1110 as discussed above. In addition, the testing module 1120 allows the on-site testing of the smoke detector 1105 and audible alarm 1110. The testing module 1120 also can temporarily disable the communication device 1115 to prevent the transmission of a false alarm during testing. Alternatively, the test module 1120 can send a control signal to the communication device 1115 in the form of a false smoke detection alarm to transmit a test message to the local controller 240 (FIG. 2).

Figure 12:
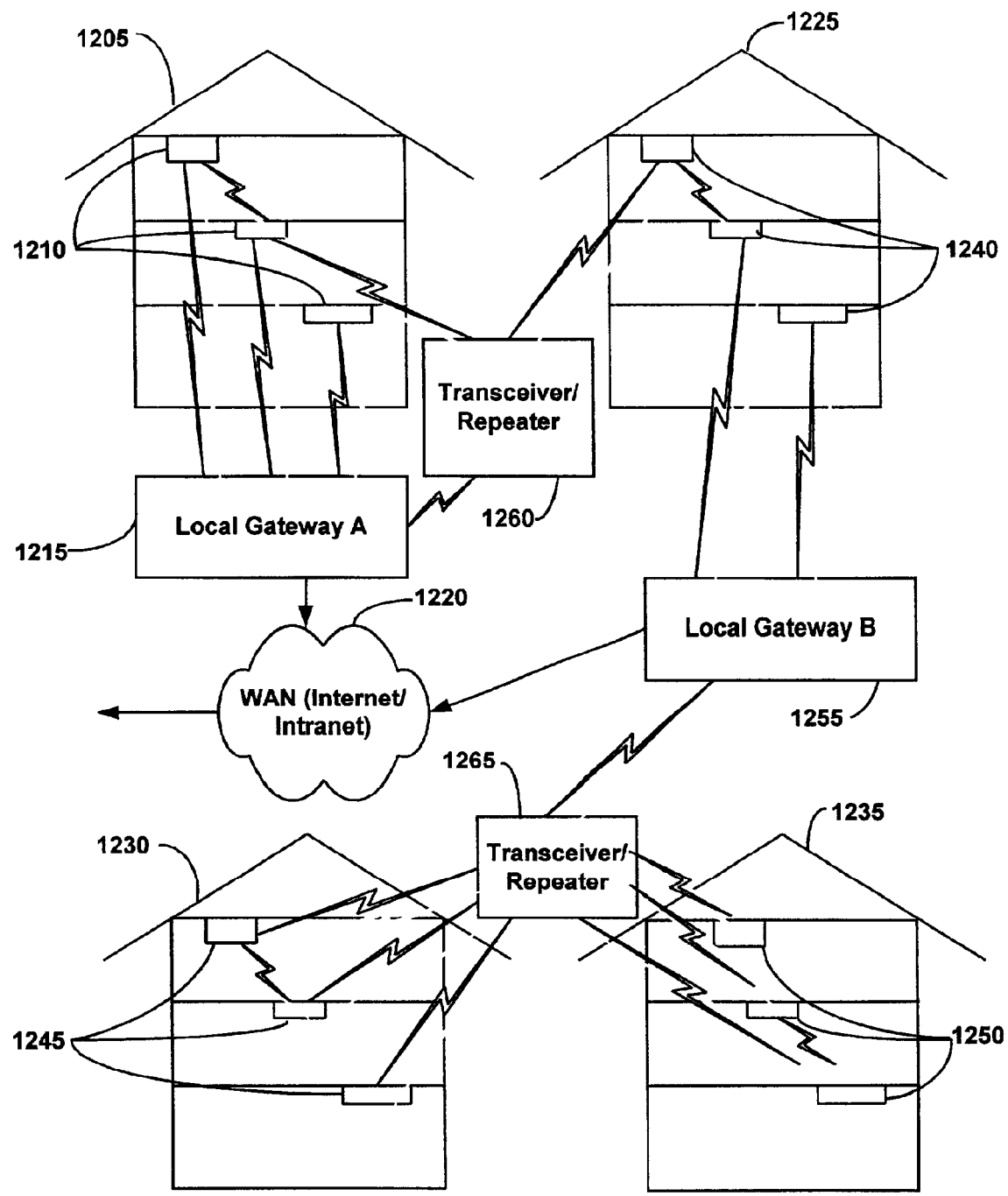
FIG. 12 sets forth an embodiment of a residential monitoring system.

FIG. 12 sets forth an embodiment of the residential monitoring system 1200. The monitoring system 1200 can comprise a single facility 1205 having multiple sensing systems 1210 communicating with a local gateway 1215 to a central location (not shown) via a WAN 1220 or other alternative method. Each of the multiple sensing systems 120 can be communicating with the local gateway through wireless or alternative means. Also, the multiple sensing systems can be communicating via a message protocol system as discussed above. It would be obvious to one of ordinary skill in the art to implement a varying number of sensing systems in a single facility.

Alternatively, the monitoring system can comprise multiple facilities with multiple sensing systems 1210, 1240, 1245, 1250 communicating with a local gateway 1215 or a local gateway 1255 via direct wireless communication or via repeater transceivers 1260, 1265. The number of devices, facilities, etc. is limited only by individual design constraints. Further information regarding various aspects of the operation of this system can be found in the commonly assigned U.S. utility patent application entitle, "System and Method for Monitoring and Controlling Residential Devices," issued Ser. No. 09/790,150.

The number of sensing systems that can be used with a single gateway or with a single WAN is limited only by the design of the local gateway and/or WAN. It would be obvious to one of ordinary skill in the art to use a local gateway and/or WAN that would accommodate the needed system.

Figure 13:
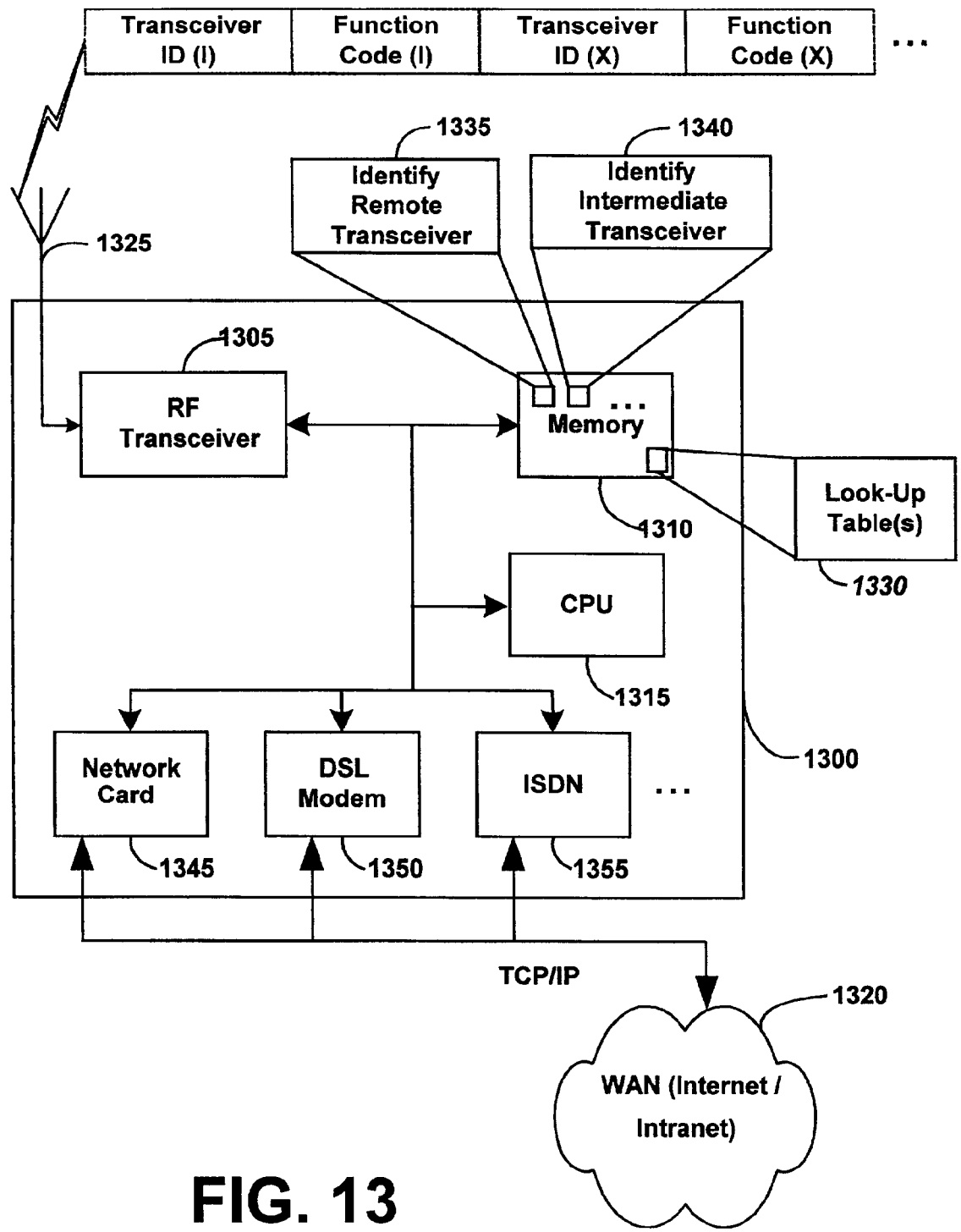
FIG. 13 sets forth an embodiment of a local controller.

FIG. 13 sets forth a block diagram of an embodiment of the local gateway 1300. The local gateway 1300 comprises an RF transceiver 1305, a memory 1310, a CPU 1315, and some means for communicating with the WAN 1320.

The RF transceiver 1305 may be configured to receive incoming RF signal transmissions via the antenna 1325. Each of the incoming RF signal transmissions may be consistently formatted in the convention previously described. The local gateway 1300 may be configured such that the memory 1310 includes a look-up table 1330 that may assist in identifying the various remote and intermediate RF communication devices used in generating and transmitting the received data transmission as illustrated in memory sectors 1335 and 1340 herein labeled, "Identify Remote Transceiver" and "Identify Intermediate Transceiver," respectively. Programmed or recognized codes within the memory 1310 may also be provided and configured for controlling the operation of a CPU 1315 to carry out the various functions that are orchestrated and/or controlled by the local gateway 1300. For example, the memory 1310 may include program code for controlling the operation of the CPU 1315 to evaluate an incoming data packet to determine what action needs to be taken. In this regard, one or more look-up tables 1330 may also be stored within the memory 1310 to assist in this process. Furthermore, the memory 1310 may be configured with program code configured to identify a remote RF transceiver 1305 or identify an intermediate RF transceiver 1305. Function codes, RF transmitter and or RF transceiver ID may all be stored with associated information within the look-up tables 1310.

Thus, one look-up table 1310 may be provided to associate transceiver identifier. Another look-up table 1330 may be used to associate function codes with the interpretation thereof. For example, a unique code may be associated by a look-up table 1330 to identify functions such as test, temperature, smoke alarm active, security system breach, etc. In connection with the lookup table(s) 1330, the memory 1310 may also include a plurality of code segments that are executed by the CPU 1315, which may in large part control operation of the gateway 1300. For example, a first data packet segment may be provided to access a first lookup table to determine the identity of a RF transceiver, which transmitted the received message. A second code segment may be provided to access a second lookup table to determine the proximate location of the message generating RF transceiver, by identifying the RF transceiver that relayed the message. A third code segment may be provided to identify the content of the message transmitted. Namely, is it a fire alarm, a security alarm, an emergency request by a person, a temperature control setting, etc. Consistent with the invention, additional, fewer, or different code segments may be provided to carryout different functional operations and data signal transfers throughout the DCCMS 200 (FIG. 2) of the present invention.

The local gateway 1300 may also include one or more mechanisms to facilitate network based communication with remote computing devices. For example, the gateway 1300 may include a network card 1345, which may allow the gateway 1300 to communicate across a local area network to a network server, which in turn may contain a backup gateway (not shown) to the WAN 215 (FIG. 2). Alternatively, the local gateway 1300 may contain a modem 1350, which may be configured to provide a link to a remote computing system, by way of the PSTN 125 (FIG. 1). In yet another alternative, the local gateway 1300 may include an ISDN card 1355 configured to communicate via an ISDN connection with a remote system. Other communication interfaces may be provided as well to serve as primary and or backup links to the WAN 215 (FIG. 2) or to local area networks that might serve to permit local monitoring of gateway 1300 health and data packet control.

Having described the physical layer of a DCCMS 200 (FIG. 2) consistent with the present invention, reference is now made to FIG. 14, which describes a data structure of messages that may be sent and received via the DCCMS 200. In this regard, a standard message may comprise a "to" address; a "from" address; a packet number; a maximum packet number, a packet length; a command portion; a data portion; a packet check sum (high byte); and a packet check sum (low byte). As illustrated in the message structure table of FIG. 14, the "to" address or message destination may comprise from 1 to 6 bytes. The "from" address or message source device may be coded in a full 6 byte designator. Bytes 11 through 13 may be used by the system to concatenate messages of packet lengths greater than 256 bytes. Byte 14 may comprise a command byte. Byte 14 may be used in conjunction with bytes 15 through 30 to communicate information as required by DCCMS 200 specific commands. Bytes 31 and 32 may comprise packet check sum bytes. The packet check sum bytes may be used by the system to indicate when system messages are received with errors. It is significant to note that bytes 31 and 32 may be shifted in the message to replace bytes 15 and 16 for commands that require only one byte. The order of appearance of specific information within the message protocol of FIG. 14 generally remains fixed although the byte position number in individual message transmissions may vary due to scalability of the "to" address, the command byte, and scalability of the data portion of the message structure.

Having described the general message structure of a message that may be sent via the DCCMS 100 of the present invention, reference is directed to FIG. 15, which illustrates three sample messages. The first message 1500 illustrates the broadcast of an emergency message "FF" from a central server with an address "0012345678" to a personal transceiver with an address of "FF."

The second message 1510 reveals how the first message might be sent to a RF transceiver that functions as a repeater. In this manner, emergency message "FF" from a central server with address "0012345678" is first sent to transceiver "FO." The second message, further contains additional command data "A000123456" that may be used by the system to identify further transceivers to send the signal through on the way to the destination device.

The third message 1515 illustrated on FIG. 15 reveals how the message protocol of the present invention may be used to "ping" a remote RF transceiver 220 (FIG. 2) in order to determine transceiver health. In this manner, source unit "E112345678" originates a ping request by sending command "08" to a transceiver identified as "A012345678." The response to the ping request can be as simple as reversing the "to address" and the "from address" of the command, such that, a healthy transceiver will send a ping message back to the originating device. The system of the present invention may be configured to expect a return ping within a specific time period. Operators of the present invention could use the delay between the ping request and the ping response to model system loads and to determine if specific DCCMS 200 parameters might be adequately monitored and controlled with the expected feedback transmission delay of the system.

It is significant to note that one or more specific types of RF transceivers may be integrated within the DCCMS 200 of the present invention. For example, one RF transceiver that may be used is the TR1000, manufactured by RF Monolithics, Inc.

As is known, the TR1000 hybrid transceiver is well suited for short range, wireless data applications where robust operation, small size, low power consumption, and low-cost are desired. All critical RF functions are contained within the single hybrid chip, simplifying circuit design and accelerating the design-in process. The receiver section of the TR1000 is sensitive and stable. A wide dynamic range log detector, in combination with digital automatic gain control (AGC) provide robust performance in the presence of channel noise or interference. Two stages of surface acoustic wave (SAW) filtering provide excellent receiver out-of-band rejection. The transmitter includes provisions for both on-off keyed (OOK) and amplitude-shift key (ASK) modulation. The transmitter employs SAW filtering to suppress output harmonics, for compliance with FCC and other regulations.

Additional details of the TR1000 transceiver need not be described herein, because the present invention is not limited by the particular choice of transceiver. Indeed, numerous RF transceivers may be implemented in accordance with the teachings of the present invention. Such other transceivers may include other 900 MHz transceivers, as well as transceivers at other frequencies. In addition, infrared, ultrasonic, and other types of transceivers may be employed, consistent with the broad scope of the present invention. Further details of the TR1000 transceiver may be obtained through data sheets, application notes, design guides (e.g., the "ASH Transceiver Designers Guide"), and other publications known those skilled in the art.

The foregoing description has been presented for purposes of illustration and description. It is not intended to be exhaustive or to limit the invention to the precise forms disclosed. Obvious modifications or variations are possible in light of the above teachings. For example, it should be appreciated that, in some implementations, the transceiver ID is not necessary to identify the location of the transceiver 400. Indeed, in implementations where the transceiver is permanently integrated into an alarm sensor other stationary device within a system, then the control system application server 205 and/or the local gateway 240 may be configured to identify the transmitter location by the transmitter identifier alone. It will be appreciated that, in embodiments that do not utilize RF transceiver/repeaters 220, the RF transmitters 235 and/or RF transceivers 225 may be configured to transmit at a higher power level, in order to effectively communicate with the local gateway 240.

The embodiment or embodiments discussed were chosen and described to illustrate the principles of the invention and its practical application to enable one of ordinary skill in the art to utilize the invention in various embodiments and with various modifications as are suited to the particular use contemplated. For example, this sensing system would easily modifiable for all binary type sensors that output a signal indicating a binary condition such as a door ajar sensor, a window sensor, a sprinkler flow sensor, etc. In addition, this sensing system would also be modifiable to accommodate any type of sensor with an output signal that can be detected by the data controller. All such modifications and variations are within the scope of the invention as determined by the appended claims when interpreted in accordance with the breadth to which they are fairly and legally entitled.

Therefore, having thus described the invention, at least the following is claimed:

1. A smoke detector comprising:
   a smoke sensor sensing a smoke condition and outputting an alarm signal upon detecting a smoke condition;
   an alarm, connected to the smoke sensor, indicating a smoke condition upon detection of the alarm signal;
   a communication device, connected to the smoke sensor, receiving the alarm signal and wirelessly transmitting an indicator of the smoke condition in a predetermined message format to a remote monitoring device upon detection of the alarm signal, each communication device having a unique address;
   wherein the smoke sensor is a photodetection smoke sensor;
   wherein the alarm is an audible alarm; and
   wherein the predetermined message format comprises at least one packet, wherein the packet comprises:
      a receiver address comprising a scalable address of the at least one of the intended receiving communication device;
      a sender address comprising the address of the sending communication device;
      a command indicator comprising a command code;
      at least one data value comprising a scalable message; and
      an error detector that is a redundancy check error detector.

2. The smoke detector of claim 1, wherein the alarm signal is transmitted using digital modulation.

3. The smoke detector of claim 2, wherein the packet further comprises:
   a packet length indicator which indicates a total number of bytes in the current packet;
   a total packet indicator which indicates the total number of packets in the current message;

a current packet indicator which indicates which packet of the total packets the current packet is; and a message number, wherein the controller generates a sender message in the preformatted command message and the transceiver generates a response message number formed by a mathematical combination of the sender message number and a predetermined offset.

4. The smoke detector of claim 2, wherein the packet further comprises:

a preface and a postscript;

wherein the preface comprises a predetermined sequence comprising a first logic level and a subsequent sequence comprising at least two bytes of a second logic level; and wherein the postscript comprises a low voltage output.

5. The smoke detector of claim 2, wherein the wireless communication comprises radio frequency (RF) communication.

6. The smoke detector of claim 2, wherein the wireless communication comprises a low powered RF communication.

7. The smoke detector of claim 2, wherein the digital modulation is encoded using at least one of the following protocols:

Manchester encoding;

Quadrature shift keying;

On-off keying; and

Amplitude shift keying.

8. A smoke detector comprising:

a smoke sensor sensing a smoke condition and outputting an alarm signal upon detecting a smoke condition;

an alarm, connected to the smoke sensor, indicating a smoke condition upon detection of the alarm signal; and a communication device, connected to the smoke sensor, receiving the alarm signal and wirelessly transmitting an indicator of the smoke condition in a predetermined message format to a remote monitoring device upon detection of the alarm signal, each communication device having an unique address;

wherein the smoke sensor is a photodetection smoke sensor;

wherein the alarm is an audible alarm;

wherein the predetermined message format comprises at least one packet, wherein the packet comprises:

a receiver address comprising a scalable address of the at least one of the intended receiving communication device;

a sender address comprising the address of the sending communication device;

a command indicator comprising a command code;

at least one data value comprising a scalable message; and an error detector that is a redundancy check error detector;

wherein the packet further comprises:

a packet length indicator which indicates a total number of bytes in the current packet;

a total packet indicator which indicates the total number of packets in the current message;

a current packet indicator which indicates which packet of the total packets the current packet is; and a message number, wherein the controller generates a sender message in the preformatted command message and the transceiver generate a response message number formed by a mathematical combination of the sender message number and a predetermined offset.

9. The smoke detector of claim 8, wherein the packet further comprises:

a preface and a postscript;

wherein the preface comprises a predetermined sequence comprising a first logic level and a subsequent sequence comprising at least two bytes of a second logic level; and wherein the postscript comprises a low voltage output.

10. The smoke detector of claim 9, wherein the wireless communication comprises radio frequency (RF) communication.

11. The smoke detector of claim 10, wherein the wireless communication comprises a low powered RF communication.

12. The smoke detector of claim 11, wherein the message comprises Manchester encoding.

* * * * *